United States Patent [19]

Okudaira et al.

[11] 4,398,642
[45] Aug. 16, 1983

[54] MULTI-PLY VESSEL AND METHOD FOR PRODUCTION THEREOF

[75] Inventors: Tadashi Okudaira; Akio Tsuboi; Shigeharu Sugihara; Yoshihisa Hama, all of Otsu, Japan

[73] Assignee: Toyo Boseki Kabushiki Kaisha, Japan

[21] Appl. No.: 269,056

[22] PCT Filed: Oct. 29, 1980

[86] PCT No.: PCT/JP80/00269
§ 371 Date: Jun. 2, 1981
§ 102(e) Date: Jun. 2, 1981

[87] PCT Pub. No.: WO81/01265
PCT Pub. Date: May 14, 1981

[30] Foreign Application Priority Data

Nov. 2, 1979 [JP] Japan ............................. 54-142483
Nov. 2, 1979 [JP] Japan ............................. 54-142486

[51] Int. Cl.³ .............................................. B65D 23/00
[52] U.S. Cl. ...................................... 215/1 C; 426/127; 428/35; 428/475.2; 428/480; 428/910
[58] Field of Search ................... 428/35, 475.2, 480, 428/910; 215/1 C, 12 R; 426/127

[56] References Cited

U.S. PATENT DOCUMENTS 3,686,069 8/1972 Winkler et al. ................. 428/475.2
3,874,989 4/1975 Stange et al. ................... 428/475.2
4,180,614 12/1979 Angelo et al. .................. 428/475.2

FOREIGN PATENT DOCUMENTS 51-98575 8/1976 Japan.
53-26877 3/1978 Japan.
833586 4/1960 United Kingdom ............ 428/475.2

*Primary Examiner*—George F. Lesmes
*Assistant Examiner*—E. Rollins Buffalow
*Attorney, Agent, or Firm*—Jones, Tullar & Cooper

[57] ABSTRACT

A multi-ply vessel which comprises an inner layer (A) composed of a thermoplastic polyester resin, a middle layer (B) composed of a metaxylylene group-containing polyamide resin and an outer layer (C) composed of a synthetic resin having impermeability to moisture, said inner layer (A) and middle layer (B) being oriented in at least one direction at the thin part of the vessel wall. This vessel is produced by orienting a parison having a multi-ply structure of the inner layer (A), the middle layer (B) and the outer layer (C) in a draw ratio of 1 to 4 times in longitudinal direction and of 2 to 7 times in crosswise direction at a temperature of from Tg+15° C. to 2(Tg)+15° C. (wherein Tg is the glass transition temperature of the thermoplastic polyester resin). This vessel has high transparency as well as excellent chemical resistance, impact resistance and the like because a thermoplastic polyester resin is used as the inner layer (A) and also has excellent gas barrier properties against oxygen because the metaxylylene group-containing polyamide resin is used as the middle layer (B).

6 Claims, No Drawings

MULTI-PLY VESSEL AND METHOD FOR PRODUCTION THEREOF

The present invention relates to multi-ply vessels having excellent gas barrier properties and high transparency, and a method for the production thereof.

Thermoplastic polyester resins, mainly polyethylene terephthalate, have widely been used for various vessels and packaging materials in the form of film and sheet because of their excellent mechanical properties, gas barrier properties, chemical resistance, scent maintenance and hygienic qualities. Particularly, with progress of blow molding techniques, especially biaxial orientation blow molding techniques, these resins are frequently employed for the production of hollow vessels such as bottles and cans. That is, for example, thermoplastic polyester bottles produced by a biaxial orientation blow molding technique are disclosed in U.S. Pat. No. 3,733,309.

However, the vessels produced from thermoplastic polyester resins, mainly polyethylene terephthalate, by a biaxial orientation technique do not necessarily satisfy all performances. Particularly, these vessels are not suitable for packing foods which require good gas barrier properties because they have poor gas barrier properties against oxygen.

A saponified ethylene-vinyl acetate copolymer, a styrene-acrylonitrile copolymer and the like have hitherto been known as thermoplastic resins having high gas barrier properties, but the vessels made from these resins alone are inferior in impact resistance or are not favorable from hygienic viewpoint and hence, can not be used in practice.

In Japanese Patent Laid Open Publication No. 108162/1978, there is disclosed that a vessel having gas barrier properties can be produced by orienting and blow-molding a vessel preform (hereinafter referred to as parison) having two-layer structure composed of a thermoplastic polyester resin and a saponified ethylene-vinyl acetate copolymer. However, when a saponified ethylene-vinyl acetate copolymer is used, the parison becomes opaque during formation thereof and shows remarkably lowered transparency because the copolymer itself is a crystalline resin. Of course, when the parison is oriented to make the wall thin, transparency thereof is somewhat improved, but the non-oriented parts, such as bottom part of a bottle, are still opaque, which causes poor appearance.

When a multi-ply vessel is produced by using a styrene-acrylonitrile copolymer, known as a resin having high gas barrier properties, together with a thermoplastic polyester resin, a parison does not lose transparency during formation thereof because the copolymer itself is a non-crystalline resin. However, the copolymer has a high glass transition temperature and hence, the parison can not be sufficiently oriented at an orienting temperature suitable for the polyester resin. Moreover, because of the non-crystallizability of the copolymer, no crystallization of the copolymer is induced by orientation and thereby, the vessel is unfavorably deformed by orientation release stress.

An object of the present invention is to provide a vessel having gas barrier properties against oxygen without losing properties of a thermoplastic polyester resin such as excellent mechanical properties, transparency, chemical resistance, hygienic qualities and the like. Another object of the present invention is to provide a vessel having excellent dimensional stability and form retention. A further object of the present invention is to provide a vessel having excellent adhesion between layers of the multi-ply structure thereof. These and other objects and advantages of the present invention will by apparent to those skilled in the art from the following description.

The vessel of the present invention has multi-ply structure composed of at least two kinds of synthetic resins. The multi-ply vessel comprises an inner layer composed of a thermoplastic polyester resin, a middle layer composed of a metaxylylene group-containing polyamide resin and an outer layer composed of a synthetic resin having impermeability to moisture, said layers of the thermoplastic polyester resin and the metaxylylene group-containing polyamide resin being oriented in at least one direction at the thin part of the vessel wall. The present invention includes a method for production of the vessel.

As the thermoplastic polyester resin which composes the inner layer of the vessel of the present invention, a conventional fiber-forming polyester resin can be used. Particularly, a polyester having repeating units consisting predominantly of ethylene terephthalate is preferable. However, a polyester such as polycyclohexane dimethylene terephthalate can also be used.

The thermoplastic polyester resin having repeating units consisting predominantly of ethylene terephthalate includes polyesters consisting of acid components comprising 80 mol% or more, preferably 90 mol% or more, of terephthalic acid and glycol components comprising 80 mol% or more, preferably 90 mol% or more, of ethylene glycol. The acid components other than terephthalic acid are a member selected from isophthalic acid, diphenyl ether-4,4'-dicarboxylic acid, naphthalene-1,4- or 2,6-dicarboxylic acid, adipic acid, sebacic acid, decane-1,10-dicarboxylic acid, hexahydroterephthalic acid and the like and the glycol components other than ethylene glycol are a member selected from propylene glycol, 1,4-butanediol, neopentyl glycol, diethylene glycol, cyclohexane dimethanol, 2,2-bis(4-hydroxyphenyl)propane, 2,2-bis(4-hydroxyethoxyphenyl)propane and the like. The thermoplastic polyester resin may also contain an oxy-acid component such as p-hydroxybenzoic acid, p-hydroxyethoxybenzoic acid and the like. The thermoplastic polyester resin may be used in a blend of two or more polyester resins, as far as the content of ethylene terephthalate is in the range mentioned above.

The thermoplastic polyester resin used in the present invention may optionally be combined with an appropriate amount of additives such as colorants, ultraviolet absorbers, antistatic agents, agents for preventing deterioration of properties due to heat and oxidation, antimicrobial agents, lubricants and the like.

The intrinsic viscosity of the thermoplastic polyester resin should be 0.55 or more, preferably 0.65 to 1.4. When the polyester resin has an intrinsic viscosity of less than 0.55, the vessel preform, i.e. parison can hardly be obtained in transparent amorphous state and further, the vessel obtained has insufficient mechanical properties.

The metaxylylene group-containing polyamide resin (hereinafter referred to as SM resin) which composes the middle layer of the vessel of the present invention is a polymer containing at least 70 mol% of a unit, which consists of metaxylylenediamine or a mixed xylylenediamine of metaxylylenediamine and 80% by weight or less of paraxylylenediamine based on the mixture, and an α,ω-aliphatic dicarboxylic acid having 6 to 12 carbon atoms, in the molecular chain thereof.

Examples of the metaxylylene group-containing polyamide resins are homopolymers such as polymetaxylyleneadipamide, polymetaxylylenesebacamide, polymetaxylylenesuberamide; copolymers such as metaxylylene/paraxylylene-adipamide copolymer, metaxylylene/paraxylylene-pimelamide copolymer, metaxylylene/paraxylylene-azeramide copolymer; and A copolymer of the monomers composing the above homopolymers or copolymers and other copolymerizable monomers such as aliphatic diamines (e.g. hexamethylenediamine), alicyclic diamines (e.g. piperazine), aromatic diamines (e.g. parabis(2-aminoethyl)benzene), aromatic dicarboxylic acids (e.g. terephthalic acid), lactams (e.g. ε-caprolactam), ω-aminocarboxylic acids (e.g. γ-aminoheptanoic acid), aromatic aminocarboxylic acids (e.g. p-aminomethylbenzoic acid) and the like. To improve impact resistance at a low temperature and adhesion, it is preferable to copolymerize 0.2 to 10% by weight based on the polyamide resin of a polyalkylene ether compound having at least one amino group or carboxyl group and having a molecular weight of 2,000 to 20,000, preferably 3,000 to 8,000, for example, bis-(aminopropyl)poly(ethylene oxide), bis(aminopropyl)-poly(butylene oxide) or the like during polymerization of the polyamide resin. In the above copolymer, the content of paraxylylenediamine in the total xylylenediamines is 80% by weight or less and the content of the unit consisting of the xylylenediamines and the aliphatic dicarboxylic acid in the molecular chain of the copolymer is at least 70 mol%. The polymers may optionally be combined with a small amount of other polymers such as nylon-6, nylon-6,6, nylon-6,10, nylon-11, nylon-12 and the like and other additives such as antistatic agents, lubricants, anti-blocking agents, stabilizers, dyestuffs, pigments and the like.

SM resin is intrinsically brittle in amorphous state, and hence, it should have a relative viscosity of 1.5 or more, preferably 2.0 or more.

Generally, in the present invention, the vessel is produced by forming the vessel preform, i.e. the multi-ply parison and the then orienting and blow-molding the parison. In order to obtain the desired vessel having excellent gas barrier properties and high transparency, the multi-ply parison should also have good transparency and further the resin components at the thin parts of the vessel wall (mainly the body thereof) should be at least uniaxially oriented, and hence, the parison should be also at least uniaxially oriented to produce such the vessel.

The outer layer of synthetic resin having impermeability to moisture of the vessel can be formed as an outer layer of a multi-ply parison or can be formed on the SM resin layer after orientation and blow molding of the parison as a finishing of the surface of the SM resin layer, coating the SM resin layer with a film, topcoating which is employed in certain kinds of glass and bottles, spray coating and the like. Preferably, the outer layer is formed as that of the multiply parison and then the parison is oriented and blow-molded to produce the vessel.

Example of the compounds or the synthetic resins used for the above finishing, topcoating or spray coating are an unsaturated monomer consisting predominantly of an unsaturated silane, a polymer of an unsaturated monomer consisting predominantly of an unsaturated silane, an epoxy silane compound, an alkoxy silane compound, an organic titanium compound, a silicone resin, a fluoroplastic, polyvinyl chloride, polyvinylidene chloride and the like. By the formation of the outer layer of these resins, impermeability to moisture is improved and change of gas barrier properties with time is prevented. Of course, when orientation and blow molding are difficult to carry out because of the formation of the outer layer, the layer should be formed after the orientation and the blow molding.

The synthetic resin used for the outer layer formed on the multi-ply parison is a thermoplastic resin which does not prevent orientation and blow molding of the thermoplastic polyester resin of the inner layer. Examples of the resin are the same kind of the thermoplastic polyester resin used for the inner layer, polyvinyl chloride, polypropylene, and a copolymer consisting predominantly of an acrylonitrile component containing 80 mol% or less of acrylonitrile and an unsaturated monomer such as styrene, ethyl acrylate and methyl acrylate.

In view of transparency and other properties of the vessel as well as recovery and reuse of the vessel, a thermoplastic polyester resin, particularly, that having repeating units consisting predominantly of ethylene terephthalate and having an intrinsic viscosity of 0.55 or more is preferred. The resin may be optionally combined with additives such as lubricants, anti-blocking agents, stabilizers, colorants, agents for providing metallic sheen and the like.

A typical method for the production of the multiply vessel of the present invention is as follows:

The vessel of the present invention can be produced by forming a multi-ply parison and orienting and blow-molding the parison according to a conventional method. Particularly, the vessel can be conveniently produced by a biaxial orientation blow molding technique at a specific temperature.

When the vessel is produced by a biaxial orientation blow molding technique, it can be produced by heating a multi-ply parison to an orienting temperature and then expanding and orientating the parison by a rod which axially moves in a metal mold and blowing compressed air into the mold to form the vessel. The multi-ply parison can be produced by successively forming the multi-ply structure step by step from the inner layer with a conventional injection molding machine or a molding machine having a plurality of equipment for melting and injection or by forming a bottom on a pipe having a multi-ply structure formed with a multi-ply extrusion molding machine.

The shape of the multi-ply parison is not critical in so far as it is in a geometric form which can be expanded. When the multi-ply parison is molded by injection, a mold temperature should be maintained low. Particularly, when the middle and outer layers are formed, it is preferable to maintain the temperature lower than that employed in formation of the inner layer. When the middle and outer layers are formed, the mold temperature is below 30° C. preferably 5° to 20° C.

In order to maintain a mold temperature in the above range, it is preferable to flow fluid such as tap water or chilled water cooled by a chiller through the inside of the mold.

When the above molding technique is carried out, the multi-ply parison having good transparency can be obtained. Moreover, one of the characteristics of the present invention is that adhesion between the layers of the vessel produced by expanding and orienting the multi-ply parison is superior to that of a vessel produced by orienting a multi-ply parison being partially opaque.

Each resin layer of the parison is generally 0.1 to 5 mm, preferably 1 to 3 mm in thickness and the total thickness of the inner, middle and outer layers is generally 1 to 8 mm, preferably 2 to 6 mm. If each layer of the parison is less than 0.1 mm in thickness, the resin to be used for the layer hardly flows in a mold. If the total thickness of the layers is more than 8 mm, the multi-ply parison becomes opaque during formation of the middle and outer layers thereof, or extremely high blowing pressure is necessitated. In comparison with injection molding, when the multi-ply parison is produced by multi-ply extrusion molding, each resin layer can be formed as thin as several tenth of a micron. However, in order to retain the shape of the vessel after biaxial orientation blow molding, each resin layer should generally be about 0.1 to 4 mm in thickness. Of course, when a parison consisting of the inner and middle layer is prepared by extrusion molding and then the outer layer is formed on the parison by surface treatment or surface coating, the thickness of the outer layer may be much thinner.

The multi-ply parison thus obtained is heated to a orienting temperature and then expanded and oriented in a blow mold to produce a biaxially oriented vessel. The orientation temperature is from $(Tg+15)°C$. to $(2Tg+15)°C$., preferably 90° to 150° C., wherein Tg means a glass transition temperature of the polyester resin.

This is based on the fact that a glass transistion temperature of the metaxylylene group-containing polyamide resin is close to that of the polyester resin. When the parison is heated to the above temperature range, expansion and orientation can be carried out without any problem.

It is not desirable that the preheating temperature is lower than $(Tg+15)°C$. since microvoids are formed in the vessel due to cold orientation and the vessel shows pearly appearance or becomes opaque. Likewise, it is not desirable that the preheating temperature is higher than $(2Tg+15)°C$., since the polyester resin of the outer layer becomes opaque due to crystallization thereof and adhesion between the resin layers is lowered. A draw ratio of 1 to 4 times in longitudinal direction and of 2 to 7 times in crosswise direction is necessary for expanding and orienting the multi-ply parison. Particularly, in view of adhesion between the layers such as between the outer layer and the middle layer or between the middle layer and the inner layer as well as transparency of the vessel, 5 to 18 times of an area draw ratio (draw ratio in longitudinal direction x draw ratio in crosswise direction) is preferable.

Although SM resin itself is intrinscially a crystalline resin, a glass transistion temperature thereof is relatively high and it readily becomes an amorphous form by quenching the molten resin to give the parison having good transparency. Additionally since the glass transition temperature of the SM resin is almost equal to that of the polyester resin, it is sufficiently oriented and crystallized under orientation conditions of the polyester resin. Thus, different from other known resins having high gas barrier properties, a vessel having high transparency as well as excellent gas barrier properties and heat stability and, therefore, having high commercial value can be obtained.

The degree of orientation can be determined by measuring the difference between the refractive index in the cross-sectional direction and that in the plane direction of a thin part of the vessel wall. In order to obtain excellent gas barrier properties and high transparency, the difference between the refractive indexes is 0.02 or more, preferably, 0.03 or more, more preferably, 0.05 or more. When the difference between the refractive indexes is less than 0.02, mechanical properties and gas barrier properties are insufficiently improved and, further, adhesion between the layers is lowered.

Where the measurement of a refractive index is difficult, the degree of orientation can also be determined based on anisotropy of mechanical properties and the like.

In the multi-ply vessel of the present invention, the middle layer of SM resin is generally $5\mu$ to 1 mm, preferably, $10\mu$ to $500\mu$ in thickness. The inner resin layer and the outer resin layer are generally $50\mu$ to 1 mm, preferably, $100\mu$ to $500\mu$ in thickness, respectively. In practice, the total thickness of the inner, middle and outer layers is $100\mu$ to 2 mm, preferably, $200\mu$ to 1 mm. Further, the ratio of the thickness of the polyester resin inner layer to that of SM resin middle layer is 1 or less. Even if this ratio becomes more than 1, any further improvement in gas barrier properties is not expected, but rather, it causes defects such as increase in orienting stress during blow molding and the like.

The description hereinbefore has referred to the process for production of the multi-ply vessel having the inner and outer layers both of which are made of the polyester resin and having the middle layer of SM resin. Optionally, the vessel of the present invention can also be produced by forming adhesive layers between the middle and the outer layers and/or between the middle and the inner layers. Particularly, when the area draw ratio is 5 times or less, adhesion between the polyester resin and SM resin is insufficient and hence, it is preferable to provide an adhesive layer. Further, when polyvinyl chloride or the like is substitited for the polyester resin of the outer layer, the vessel of the present invention can be produced under the above conditions. However, when the outer layer is formed by finishing of the surface of SM resin layer or topcoating, thickness of the outer layer may be much thinner.

Examples of adhesives for improving ply separation resistance are a copolyester resin, a copolyamide resin, an $\alpha$-olefin vinyl ester copolymer, a modified olefin resin containing carbonyl group, a urethane modified copolyester resin or the like, a melting or softening temperature of which is about 200° C. or less, preferably, 70° to 200° C. Optionally, these resins may be further copolymerized with an ingredient containing a small amount of an acid metallic salt group.

Where the moisture permeation resistance of the synthetic resin outer layer is insufficient, a treatment for improving moisture permeation resistance can be further effected on the surface of the outer layer or an additional layer can be provided on the outer layer.

Although the description has referred to the multi-ply vessel (bottle) produced by orienting and blow-molding the multi-ply parison and the method thereof, the present invention is not limited thereto. For example, the multi-ply vessel of the present invention includes a can produced by orienting and blow-molding a multi-ply cylinder to expand the cylinder, optionally thermosetting the cylinder, cutting the cylinder in an appropriate length and then sealing at least one end thereof with a sealing plate of a metal or a plastic, or a vessel produced by deep-drawing a laminate sheet.

The following examples further illustrate the present invention.

The methods of measurement of main characteristics determined in the present invention are as follows:

(1) intrinsic viscosity [η] of the polyester resin: It was measured at 30° C. by using the mixed solvent of phenol-tetrachloroethane (6:4, w/w).

(2) Relative viscosity [η rel] of the polyamide resin: It was measured at 25° C. by dissolving the resin (1 g) in 96% sulfuric acid (100 ml).

(3) Glass transition temperature (Tg): It was measured at a heat-up rate of 20° C./min by using Differential Scanning Colorimeter manufactured by Perkin Elmer (DSC-1B)

(4) Melting point (Tm): It was measured by the same manner as in Tg.

(5) Refractive index: It was measured at 25° C. by using Abbe refractometer equipped with a polarizing plate and using D-line of a sodium lamp. A specimen (1.5 cm square) was cut off from a thin part of the body of the multi-ply vessel obtained and refractive indexes thereof in axial and peripheral directions were measured. The degree of orientation was determined by calculating birefringence of the specimen as follows:

$$\text{Birefringence } (\Delta n) = \frac{nx + ny}{2} - nz$$

in which nx and ny are refractive indexes in axial and peripheral directions (plane direction), respectively, and nz is refractive index of the specimen in cross-sectional direction.

(6) Transparency and haze: Haze meter-S manufactured by Toyo Seiki was used and according to JIS-K6714, these were calculated as follows:

$$\text{Transparency} = (T_2/T_1) \times 100 \, (\%)$$

$$\text{Haze} = \frac{T_4 - T_3 \cdot (T_2/T_1)}{T_2} \times 100 \, (\%)$$

in which $T_1$ is an amount of incident light, $T_2$ is a total amount of transmitted light, $T_3$ is an amount of light scattered by the device and $T_4$ is an amount of light scattered by the device and the specimen.

(7) Amount of oxygen permeation: According to ASTM-D-1434-58, it was determined by measuring pressure change at 30° C. with a twin gas transmission measuring instrument manufactured by Rika Seiki Kogyo (cc/m$^2$.24 hr. atm).

(8) Amount of moisture permeation: According to JIS-Z-0208, it was determined by measuring weight gain at 40° C. under 90% RH by cup method (g/m$^2$.24 hr).

(9) Tensile characteristics: Yield strength, tensile elongation at break and tensile strength at break of a specimen strip of 10 mm in width were measured at 23° C., 50 mm/min of strain rate by using Tensilon manufactured by Toyo Bowldwin having 50 mm of distance between the chucks.

EXAMPLES 1 AND 2 AND REFERENCE EXAMPLE 1

A multi-ply parison of 35 mm in outer diameter, 140 mm in length and 5 mm in thickness was formed by using a polyethylene terephthalate (hereinafter referred as PET) of [η]=0.72, Tm=257° C. and Tg=70° C. as the polyester resin of the inner and outer layers thereof and a polymetaxylyleneadipamide (metaxylylenediamine:paraxylylenediamine=99:1, w/w) or ηrel=2.2, Tm=237° C. and Tg=75° C. (hereinafter referred to as SM-1) in Example 1 or SM-1 copolymerized with 2.5% by weight of polyethylene glycol diamine having a molecular weight of 4000 of ηrel=2.35, Tm=235° C. and Tg=73° C. (hereinafter referred to as SM-2) in Example 2 as the metaxylylene group-containing polyamide resin of the middle layer thereof. In Reference Example 1, a parison of the same shape as in Examples 1 and 2 was formed by using a polyethylene terephthalate of [η]=0.72.

The formation of the multi-ply parison was carried out by forming the inner parison of the polyester resin of 2 mm in thickness and laminating the SM resin middle layer and then, the polyester resin outer layer on the inner parison with successively changing the metal molds to obtain the multi-ply parison. Thickness of each layer of the parison was inner layer:middle layer:outer layer=2 mm:1.5 mm:1.5 mm.

Besides, the molding was carried out by using N-95 injection machine manufactured by Nippon Seikosho under the conditions shown in Table 1.

TABLE 1

|  | Inner layer (PET) | Middle layer (SM) | Outer layer (PET) |
|---|---|---|---|
| Cylinder temperature (°C., from hopper side) | 270 × 290 × 290 | 260 × 280 × 280 | 270 × 290 × 290 |
| Injection pressure (kg/cm² gauge) | 40 | 50 | 60 |
| Mold temperature (°C.) | 20 | 15 | 12 |
| Injection pressure dwell (sec) | 15 | 15 | 15 |
| Cooling time (sec) | 25 | 25 | 25 |

The open end of the parison thus obtained was fitted into a parison fitting part having a rotary drive and the parison was heated with rotating in an oven having a far infrared heater until the surface temperature of the parison rose to 110° C. After heating, the parison was transferred into a blow mold and blow-molded at a travel rate of an orienting rod of 22 cm/sec under a compressed gas pressure of 20 kg/cm² to obtain a hollow vessel in a beer bottle shape of 265 mm in length, 80 mm in outer diameter of the body and 1000 ml in internal space. Properties of the vessel thus obtained are shown in Table 2.

TABLE 2

|  | Example 1 | Example 2 | Reference Example 1 |
|---|---|---|---|
| Transparency (%) | 87 | 86 | 89 |
| Haze (%) | 2.0 | 6.5 | 1.3 |
| Amount of oxygen permeation (cc/m² · 24 hr · atm) | 1.5 | 1.7 | 14 |
| Amount of moisture permeation (g/m² · 24 hr) | 0.6 | 0.6 | 0.5 |
| Birefringence (Δn) | 0.058 | 0.053 | 0.068 |
| Yield strength (kg/cm²) | 972 | 824 | 1068 |
| Tensile strength at break (kg/cm²) | 1417 | 1212 | 1542 |
| Tensile elongation at break (%) | 80 | 86 | 76 |

Note:
All the specimens used were cut off from the main body portions.

As is clear from the results of Table 2, the vessels of Examples 1 and 2 have remarkably improved oxygen barrier properties without any deterioration of transparency and mechanical properties in comparison with the vessel of the polyethylene terephthalate alone.

EXAMPLES 3 TO 6 AND REFERENCE EXAMPLES 2 TO 4

Various parisons were formed by using PET in Example 1 as the polyester resin of the inner and outer layers thereof and SM-1 as the metaxylylene group-containing polyamide resin of the middle layer thereof. In each case, thickness of each layer of the parison was inner layer:middle layer:outer layer=2 mm:1.5 mm:1.5 mm. The molding of the parison was carried out by using N-95 injection machine manufactured by Nippon Seikosho and biaxial orientation blow molding was effected by using a molding machine in Katata Laboratories of Toyo Boseki manufactured by way of experiment. Each hollow vessel thus obtained had a beer bottle shape of 265 mm in length, 80 mm in outer diameter of the body and 1000 ml in internal space (Examples 3 to 6 and Reference Examples 2 and 3) or of 200 mm in length, 80 mm in outer diameter of the body and 700 ml in internal space (Reference Example 4). The molding conditions in each Examples are shown in Table 3 and properties of the vessel thus obtained are shown in Table 4.

TABLE 3

|  | Ex. 3 | Ex. 4 | Ex. 5 | Ref. Ex. 2 | Ref. Ex. 3 | Ex. 6 | Ref. Ex. 4 |
|---|---|---|---|---|---|---|---|
| Molding conditions of parison |  |  |  |  |  |  |  |
| Cylinder temp. (°C., from hopper) |  |  |  |  |  |  |  |
| Inner layer | | | 270 × 290 × 290 | | | | |
| Middle layer | | | 260 × 280 × 280 | | | | |
| Outer layer | | | 270 × 290 × 290 | | | | |
| Injection pressure (kg/cm², guage) | | | | | | | |
| Inner layer | | | 40 | | | | |
| Middle layer | | | 50 | | | | |
| Outer layer | | | 60 | | | | |
| Injection pressure dwell (sec) | | | 15, all inner layer, middle layer and outer layer | | | | |
| Cooling time (sec) | | | 25, all inner layer, middle layer and outer layer | | | | |
| Mold temp. (°C.) | | | | | | | |
| Inner layer | | | 30 | | | 30 | |
| Middle layer | | | 20 | | | 20 | |
| Outer layer | | | 10 | | | 10 | |
| Parison size (mm) | | | | | | | |
| Outer diameter | | | 35 | | | 24 | 35 |
| Length | | | 140 | | | 100 | 140 |
| Thickness | | | 5 | | | 5 | 5 |
| Blow molding conditions | | | | | | | |
| Travel rate of orienting rod (cm/sec) | | | | 22 | | | |
| Compressed gas pressure (kg/cm²) | | | | 20 | | | |
| Orientation temp. (°C.) | 90 | 120 | 150 | 80 | 160 | 120 | 120 |
| Draw ratio | | | | | | | |
| Axial (a) | | | 2.04 | | | 3.06 | 1.50 |
| Peripheral (b) | | | 2.74 | | | 4.52 | 2.74 |
| Plane (a × b) | | | 5.59 | | | 13.8 | 4.11 |

TABLE 4

|  | Ex. 3 | Ex. 4 | Ex. 5 | Ref. Ex. 2 | Ref. Ex. 3 | Ex. 6 | Ref. Ex. 4 |
|---|---|---|---|---|---|---|---|
| Transparency (%) | 86 | 87 | 86 | could not be shaped | 70 | 88 | 85 |
| Haze (%) | 2.1 | 2.0 | 2.3 | | 32 | 1.8 | 2.1 |
| Amount of oxygen permeation (cc/m² · 24 hr · atm) | 1.4 | 1.5 | 1.8 | | 2.8 | 1.4 | 2.8 |
| Amount of moisture permeation (g/m² · 24 hr) | 0.5 | 0.6 | 0.6 | | 0.8 | 0.5 | 0.7 |
| Birefringence (Δn) | 0.078 | 0.058 | 0.053 | | 0.021 | 0.092 | 0.018 |
| Yield strength (kg/cm²) | 1216 | 972 | 862 | | 598 | 1826 | 582 |
| Tensile strength at break (kg/cm²) | 1932 | 1417 | 1217 | | 743 | 2333 | 714 |
| Tensile elongation at break (%) | 58 | 80 | 112 | | 228 | 41 | 242 |

As is clear from the results of Tables 3 and 4, all the vessels of the present invention obtained in Examples 3 to 6 have high transparency as well as excellent gas barrier properties and mechanical properties.

To the contrary, in Reference Example 2, the orientation temperature is too low and hence, an extremely high stress is needed in orientation. Then the parison is broken in the orienting and blowing step or cannot be shaped to the desired form, or, even if the parison can be shaped, the bottle is hardly used in practice since the appearance thereof becomes extremely pearly. In Reference Example 3, the orientation temperature is too high and the parison becomes opaque due to crystallization of the surface layer thereof in the heating step. Moreover, there are some defects, for example, insufficient mechanical properties such as drop impact strength and the like due to insufficient effect of orientation.

Further, in Reference Example 4, the area draw ratio is 5 times or less and hence, adhesion between the resin layers is insufficient which results in ply separation by drop impact. In case that the area draw ratio is small, the problem of ply separation can be solved by providing an adhesive layer between the polyester layer and SM resin layer. Improvement of mechanical properties due to improved adhesion is also expected by providing the adhesive layer.

EXAMPLES 7 TO 10 AND REFERENCE EXAMPLES 5 TO 7

Hollow vessels were obtained by the same procedure as in Examples 3 to 6 and Reference Examples 2 to 4 except that SM-2 was used as the metaxylylene group-containing polyamide resin of the middle layer. Besides, the molding conditions employed in Examples 7 to 10 and Reference Examples 5 to 7 were corresponding to those in Examples 3 to 6 and Reference Examples 2 to 4 as shown in Table 3.

Properties of the vessels thus obtained are shown in Table 5.

TABLE 5

|  | Ex. 7 | Ex. 8 | Ex. 9 | Ref. Ex. 5 | Ref. Ex. 6 | Ex. 10 | Ref. Ex. 7 |
|---|---|---|---|---|---|---|---|
| Transparency (%) | 87 | 86 | 86 | could not be shaped | 64 | 87 | 82 |
| Haze (%) | 4.9 | 6.5 | 6.7 | | 48 | 3.5 | 6.8 |
| Amount of oxygen permeation (cc/m² · 24 hr · atm) | 1.6 | 1.7 | 1.8 | | 2.6 | 1.5 | 2.6 |
| Amount of moisture permeation | | | | | | | |

TABLE 5-continued

|  | Ex. 7 | Ex. 8 | Ex. 9 | Ref. Ex. 5 | Ref. Ex. 6 | Ex. 10 | Ref. Ex. 7 |
|---|---|---|---|---|---|---|---|
| (g/m² · 24 hr) | 0.6 | 0.6 | 0.6 |  | 0.8 | 0.5 | 0.7 |
| Birefringence (Δn) | 0.076 | 0.053 | 0.051 |  | 0.020 | 0.090 | 0.017 |
| Yield strength (kg/cm²) | 1200 | 824 | 822 |  | 596 | 1834 | 590 |
| Tensile strength at break (kg/cm²) | 1886 | 1212 | 1196 |  | 802 | 2362 | 726 |
| Tensile elongation at break (%) | 62 | 86 | 87 |  | 203 | 43 | 206 |

As is clear from the results of Table 5, Examples 7 to 10 and Reference Examples 5 to 7 showed the same results as those in Examples 3 to 6 and Reference Examples 2 to 4, respectively. That is, the vessels having high transparency as well as excellent gas barrier properties and mechanical properties were obtained in Examples 7 to 10. However, in Reference Examples 5 to 7, a vessel having sufficient commercial value as in the present invention could not be obtained. Further, the vessel obtained according to the present invention had excellent dimensional stability and form retention.

EXAMPLE 11

By using PET and SM-1 as in Example 1, a two-layer parison without an outer layer (PET layer=3.5 mm in thickness, SM-1 layer=1.5 mm in thickness) was formed under the same conditions as in Example 3. After applying a coat of a polyvinyl chloride resin on the outer surface of the parison, a vessel was produced by orienting and blow-molding the parison under the same conditions as in Example 3. As the results, a vessel having 85% of transparency, 2.2% of haze, 1.3 cc/m².24 hr atm of oxygen permeation and 0.6 g/m².24 hr of moisture permeation, that is, having excellent transparency and gas barrier properties was obtained. The vessel had 1195 kg/cm² of yield strength and 1820 kg/cm² of tensile strength.

What is claimed is:

1. A biaxially oriented blow-molded transparent multi-ply vessel having dimensional stability and form retention characteristics having a multi-ply structure composed of at least two kinds of synthetic resins which comprises an inner layer composed of a thermoplastic polyester resin having an intrinsic viscosity of 0.55 or more, an intermediate layer composed of metaxylylene group-containing polyamide resin and an outer layer composed of a synthetic resin having impermeability to moisture, said layers of the thermoplastic polyester resin and the metaxylylene group-containing polyamide resin being oriented in at least one direction at the thin part of the vessel wall.

2. A multi-ply vessel according to claim 1 wherein the thermoplastic polyester resin is that having repeating units consisting predominantly of ethylene terephthalate.

3. A multi-ply vessel according to claim 1 wherein the synthetic resin having impermeability to moisture of the outer layer is a thermoplastic polyester resin.

4. A multi-ply vessel according to claim 3 wherein the thermoplastic polyester resin is that having repeating units consisting predominantly of ethylene terephthalate.

5. The vessel as in claim 1 wherein said layers of polyester resin and polyamide resin are oriented to such a degree that the birefringence at the thin part of the vessel wall is 0.03 or more.

6. The vessel as in claim 1 which consists of said layers.

* * * * *